(12) United States Patent
Wu et al.

(10) Patent No.: US 11,662,937 B2
(45) Date of Patent: May 30, 2023

(54) COPYING DATA BASED ON OVERWRITTEN PROBABILITIES

(71) Applicant: EMC IP Holding Company LLC, Hopkinton, MA (US)

(72) Inventors: Yuanyang Wu, Shanghai (CN); Yifeng Lu, Shanghai (CN)

(73) Assignee: EMC IP Holding Company LLP, Hopkinton, MA (US)

(*) Notice: Subject to any disclaimer, the term of this patent is extended or adjusted under 35 U.S.C. 154(b) by 0 days.

(21) Appl. No.: 17/518,976

(22) Filed: Nov. 4, 2021

(65) Prior Publication Data

US 2022/0334724 A1 Oct. 20, 2022

(30) Foreign Application Priority Data

Apr. 20, 2021 (CN) .......................... 202110426182.9

(51) Int. Cl.
*G06F 3/06* (2006.01)

(52) U.S. Cl.
CPC ............ *G06F 3/065* (2013.01); *G06F 3/0611* (2013.01); *G06F 3/0671* (2013.01)

(58) Field of Classification Search
CPC ......... G06F 3/0611; G06F 3/0647–065; G06F 3/0671
See application file for complete search history.

(56) References Cited

U.S. PATENT DOCUMENTS

| 10,031,690 B1 | 7/2018 | Panidis et al. |
| 10,235,060 B1 | 3/2019 | Baruch et al. |
| 10,936,238 B2 | 3/2021 | Power et al. |
| 11,323,513 B1 | 5/2022 | Vibhor et al. |
| 2017/0262328 A1* | 9/2017 | Hirose ................ G06F 11/0778 |
| 2020/0264796 A1* | 8/2020 | Lyu ....................... G06F 3/0646 |

* cited by examiner

*Primary Examiner* — Chie Yew
(74) *Attorney, Agent, or Firm* — BainwoodHuang

(57) ABSTRACT

Techniques for replicating data involve: determining overwritten probabilities of a plurality of data blocks of a source storage device. The techniques further involve: classifying the plurality of data blocks as cold data blocks or hot data blocks based on the overwritten probabilities in the plurality of data blocks. The techniques further involve: replicating at least a portion of the cold data blocks to a target storage device prior to the hot data blocks. Accordingly, transmission resources used to re-replicate overwritten data during an initial replication period can be reduced, thereby achieving efficient data replication.

13 Claims, 6 Drawing Sheets

COPYING DATA BASED ON OVERWRITTEN PROBABILITIES

CROSS-REFERENCE TO RELATED APPLICATION

This application claims priority to Chinese Patent Application No. CN202110426182.9, on file at the China National Intellectual Property Administration (CNIPA), having a filing date of Apr. 20, 2021, and having "METHOD, ELECTRONIC DEVICE AND COMPUTER PROGRAM PRODUCT FOR COPYING DATA" as a title, the contents and teachings of which are herein incorporated by reference in their entirety.

TECHNICAL FIELD

Embodiments of the present disclosure relate to the field of data storage, and more particularly, to a method, an electronic device, and a computer program product for replicating data.

BACKGROUND

In current storage systems, data migration from a source storage device to a target storage device is very common. For example, in a synchronous data replication scenario, in order to protect data, it is usually necessary to replicate the data from the source storage device to the target storage device for backup on the target storage device.

SUMMARY OF THE INVENTION

In a first aspect of the present disclosure, a method for replicating data is provided. The method includes: determining overwritten probabilities of a plurality of data blocks in a source storage device, the overwritten probability of each data block indicating the probability of the corresponding data block being overwritten in the source storage device before the plurality of data blocks are all replicated to a target storage device. The method further includes: classifying the plurality of data blocks as cold data blocks or hot data blocks based on the overwritten probabilities in the plurality of data blocks. The overwritten probabilities of the hot data blocks are higher than the overwritten probabilities of the cold data blocks. The method further includes: replicating at least a portion of the cold data blocks to a target storage device prior to the hot data blocks.

In a second aspect of the present disclosure, an electronic device is provided. The electronic device includes a processor and a memory that is coupled to the processor and has instructions stored therein. The instructions, when executed by the processor, cause the device to execute actions. The actions include: determining overwritten probabilities of a plurality of data blocks in a source storage device, the overwritten probability of each data block indicating the probability of the corresponding data block being overwritten in the source storage device before the plurality of data blocks are all replicated to a target storage device. The actions further include: classifying the plurality of data blocks as cold data blocks or hot data blocks based on the overwritten probabilities of the plurality of data blocks. The overwritten probabilities of the hot data blocks are higher than the overwritten probabilities of the cold data blocks. The actions further include: replicating at least a portion of the cold data blocks to a target storage device prior to the hot data blocks.

In a third aspect of the present disclosure, a computer program product is provided. The computer program product is tangibly stored on a computer-readable medium and includes machine-executable instructions. The machine-executable instructions, when executed, cause a machine to execute the method according to the first aspect.

In the embodiments of the present disclosure, with the data recovery solution of the present application, transmission resources used to re-replicate overwritten data during an initial replication period can be reduced, thereby achieving efficient data replication.

The Summary of the Invention section is provided to introduce the selection of concepts in a simplified form, which will be further described in the Detailed Description below. The Summary of the Invention section is neither intended to identify key features or main features of the embodiments of the present disclosure, nor intended to limit the scope of the present disclosure.

BRIEF DESCRIPTION OF THE DRAWINGS

The above and other objectives, features, and advantages of embodiments of the present disclosure will become more apparent by describing example embodiments of the present disclosure in more detail in combination with the accompanying drawings. In the example embodiments of the present disclosure, the same reference numerals generally represent the same parts.

DETAILED DESCRIPTION

Figure 1:
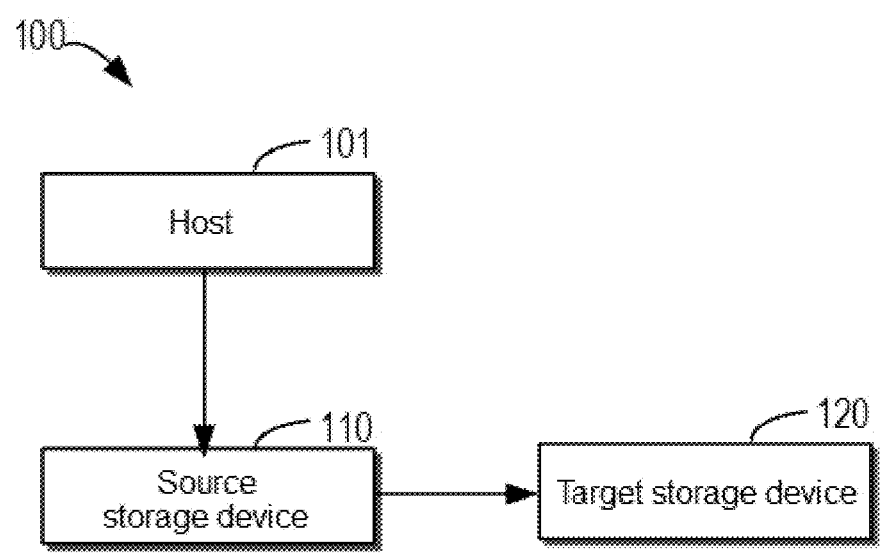
FIG. 1 shows a schematic diagram of an example environment in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the embodiments of the present disclosure will be described below with reference to several example embodiments shown in the accompanying drawings. Although preferred embodiments of the present disclosure are shown in the accompanying drawings, it should be understood that these embodiments are described only to enable those skilled in the art to better understand and then implement the embodiments of the present disclosure, and are not intended to impose any limitation to the scope of the present disclosure.

The term "include" and variants thereof used herein indicate open-ended inclusion, that is, "including but not limited to." Unless specifically stated, the term "or" means "and/or." The term "based on" means "based at least in part on." The terms "an example embodiment" and "some embodiments" mean "at least one example embodiment." The term "another embodiment" means "at least one further embodiment." The terms "first," "second," and the like may refer to different or identical objects. Other explicit and implicit definitions may also be included below. The terms "transmission bandwidth" and "bandwidth" are used interchangeably.

As mentioned above, in current storage systems, data migration from a source storage device to a target storage device is very common. This data migration may be used for data backup, which may provide available data backups when the source storage device fails. However, before all data to be replicated in the source storage device is replicated to the target storage device, data in the target storage device is incomplete. In this case, the data in the target storage device may be unavailable. For example, it may be impossible to open a file with a portion of missing data. Therefore, it is necessary to shorten the initial replication completion time as much as possible to provide more effective data protection. It should be understood that the term "initial replication" used herein refers to replicating to-be-replicated data in the source storage device to the target storage device for the first time, and the term "initial replication completion" means that all the to-be-replicated data in the source storage device has been replicated to the target storage device for the first time.

In order to shorten the initial replication completion time, many factors need to be considered comprehensively, such as the transmission bandwidth used for data replication and data volume. The transmission bandwidth may be limited by the input and output limitations of a communication network and/or a storage device. In particular, when the data in the source storage device may be overwritten during the initial replication period, a storage system may need to use a portion of the transmission resources to re-replicate the overwritten data to the target storage device. For example, in the case of synchronous replication, if the data that has been initially replicated to the target storage device is overwritten in the source storage device, the storage system also needs to re-replicate the overwritten data to the target storage device to achieve data backup. In this case, the storage system may need to allocate a portion of bandwidth for re-replication while performing the initial replication, thereby prolonging the initial replication completion time.

According to the embodiments of the present disclosure, a solution for replicating data is provided. In this solution, overwritten probabilities of a plurality of data blocks in a source storage device are determined; the plurality of data blocks are classified as cold data blocks or hot data blocks based on the overwritten probabilities of the plurality of data blocks; and at least a portion of the cold data blocks are replicated to a target storage device prior to the hot data blocks. In this way, transmission resources used to re-replicate overwritten data during an initial replication period can be reduced, thereby achieving efficient data replication.

Basic principles and several example embodiments of the present disclosure are illustrated below with reference to FIG. 1 to FIG. 5. It should be understood that these example embodiments are provided only to enable those skilled in the art to better understand and then implement the embodiments of the present disclosure, and not to limit the scope of the present disclosure in any way.

FIG. 1 shows example environment 100 in which embodiments of the present disclosure can be implemented. As shown in FIG. 1, environment 100 includes host 101, source storage device 110, and target storage device 120. Host 101 may perform read and write operations on source storage device 110. Source storage device 110 may be used to store data. Target storage device 120 may be used to back up data in source storage device 110. Source storage device 110 and target storage device 120 may be nonvolatile storage devices. Source storage device 110 and target storage device 120 may be different physical storage devices.

It should be understood that environment 100 shown in FIG. 1 is merely an example and should not constitute any limitation to the functions and scope of the implementations described in the present disclosure.

Figure 2:
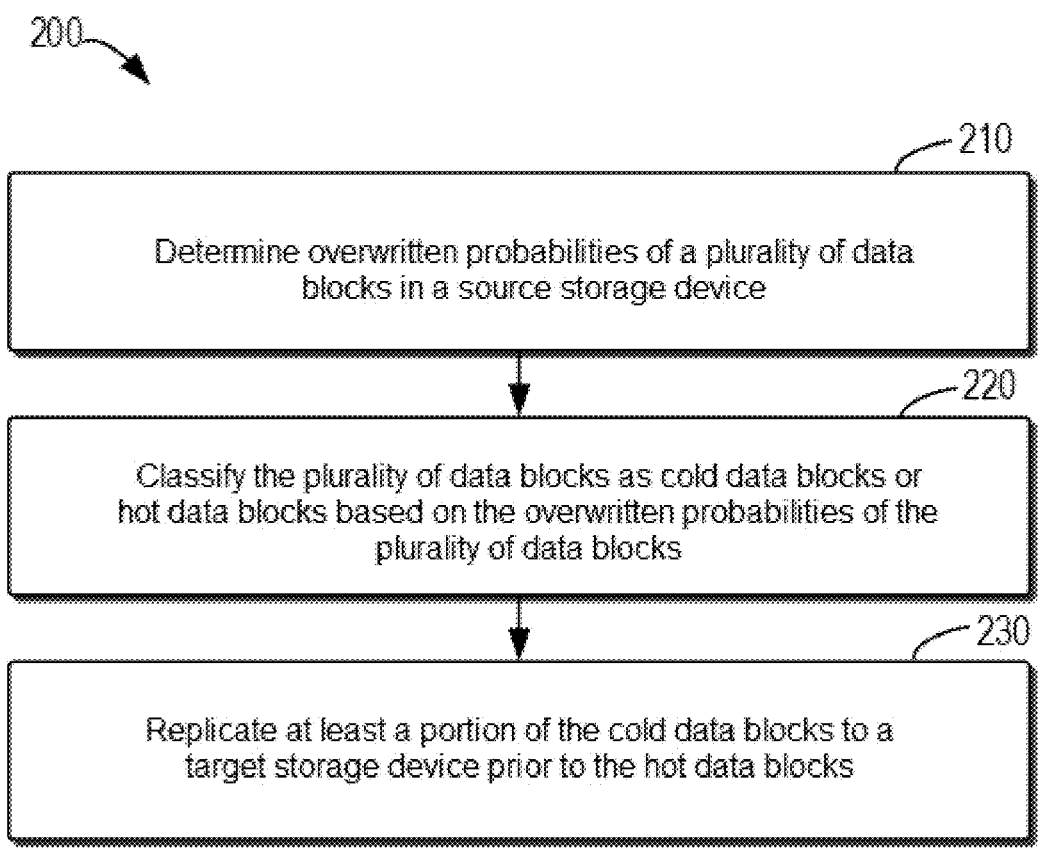
FIG. 2 shows a flowchart of data replication according to some embodiments of the present disclosure.

FIG. 2 shows a flowchart of example method 200 for replicating data according to embodiments of the present disclosure. Method 200 may be performed, for example, in example environment 100 as shown in FIG. 1. It should be understood that method 200 may also include additional actions not shown and/or may omit actions shown, and the scope of the present disclosure is not limited in this regard. Method 200 is described in detail below in connection with FIG. 1.

At block 210, overwritten probabilities of a plurality of data blocks in source storage device 110 are determined. The overwritten probability of each data block indicates the probability of the corresponding data block being overwritten in source storage device 110 before the plurality of data blocks are all replicated to target storage device 120. A data block may be a unit of data transmitted between a main memory and an input device, an output device, or an external memory. For example, the data transmission in host 101, source storage device 110, and target storage device 120 may be in units of data blocks. The plurality of data blocks of source storage device 110 may refer to data to be initially replicated to target storage device 120. For example, in a synchronous replication scenario, a plurality of data blocks may refer to data in source storage device 110 to be backed up for the first time. In another example, in a resynchronization scenario, a plurality of data blocks may refer to changed data that has not been synchronized in source storage device 110.

As described above, during the initial replication period, host 101 may simultaneously overwrite the data in source storage device 110. The overwritten probability of each data block indicates the probability of the corresponding data block being overwritten in source storage device 110 before the plurality of to-be-replicated data blocks are initially replicated to target storage device 120. In other words, the overwritten probability of each data block indicates the probability of the corresponding data block being overwritten before the initial replication is completed. Various modes may be used to determine the overwritten probabilities of a plurality of data blocks of source storage device 110. For example, the overwritten probabilities of the plurality of data blocks of source storage device 110 may be determined based on the read and write history of the data blocks. For example, a prediction model may be established based on the read and write history to predict the probability of each data block being overwritten before the initial replication is completed. In some embodiments, the overwritten probabilities may also be determined based on the types of data blocks. Examples of the types of data blocks may include read-only, rewritable, etc. For read-only data, the overwritten probability will be zero. The types of data blocks may also indicate the content of data. For example, the types of data blocks may indicate that data in the data blocks is video data. In this case, the probability of data being overwritten may be small. The overwritten probability of a target data block may also be determined based on the overwritten probability of a neighboring data block. For example, adjacent data blocks may store data from the same file. If the neighboring data block is overwritten, the overwritten probability of the target data block may be higher.

In some embodiments, each data block may include at least one data unit. The data unit may be the smallest unit of data storage, such as one bit. In this case, the overwritten probability of each data block may be determined by determining the probability of each data unit being overwritten before the plurality of data blocks are all initially replicated to target storage device 120. For example, the overwritten probability of each data block may be determined based on an average value of the possibility of the data unit in the data block being overwritten. In another example, the overwritten probability of each data block may be determined based on a maximum value of the possibility of the data unit in the data block being overwritten. In another example, the overwritten probability of each data block may be determined based on a minimum value of the possibility of the data unit in the data block being overwritten.

Similarly, the possibility of each data unit being overwritten may be determined in many ways. For example, the possibility of each data unit being overwritten may be determined based on the read and write history of the data unit. For example, a prediction model may be established based on the read and write history to predict the possibility of each data unit being overwritten before the initial replication is completed. In some embodiments, the possibility of being overwritten may also be determined based on the types of data units. The types of data units may be the same as the type of database. The possibility of a target data unit being overwritten may also be determined based on the possibility of a neighboring data unit being overwritten. For example, adjacent data units may store data from the same file. If the neighboring data unit is overwritten, the possibility of the target data unit being overwritten is higher. Based on the possibility of the data units being overwritten, the data units may be classified as cold data or hot data. For example, data units with a possibility of being overwritten higher than 0.7 may be classified as hot data.

At block 220, the plurality of data blocks are classified as cold data blocks or hot data blocks based on the overwritten probabilities of the plurality of data blocks. The overwritten probabilities of the hot data blocks are higher than the overwritten probabilities of the cold data blocks. The plurality of data blocks may be classified as cold data blocks or hot data blocks based on a predetermined threshold. For example, data blocks with an overwritten probability higher than 0.5 may be classified as hot data blocks. It should be understood that each data block may include a data unit with a higher possibility of being overwritten and a data unit with a lower possibility of being overwritten. The overwritten probability of a data block may indicate the possibility of a plurality of data units included therein being overwritten as a whole. Hot data blocks may indicate data that will be overwritten before the initial replication is completed. The scope of the present disclosure does not limit the manner of classifying the data in source storage device 110 as cold data blocks or hot data blocks.

At block 230, at least a portion of the cold data blocks are replicated to target storage device 120 prior to the hot data blocks. Considering that the hot data blocks will be re-overwritten before the initial replication is completed, if the hot data blocks are initially replicated before the cold data blocks are initially replicated, more transmission resources may be required to re-replicate the overwritten hot data blocks. Therefore, by initially replicating the cold data blocks before initially replicating the hot data blocks, the initial replication time can be shortened when the transmission bandwidth is limited, thereby effectively protecting user data. The details of an initial replication process in this solution will be described in detail below with reference to FIGS. 3 to 4.

Figure 3:
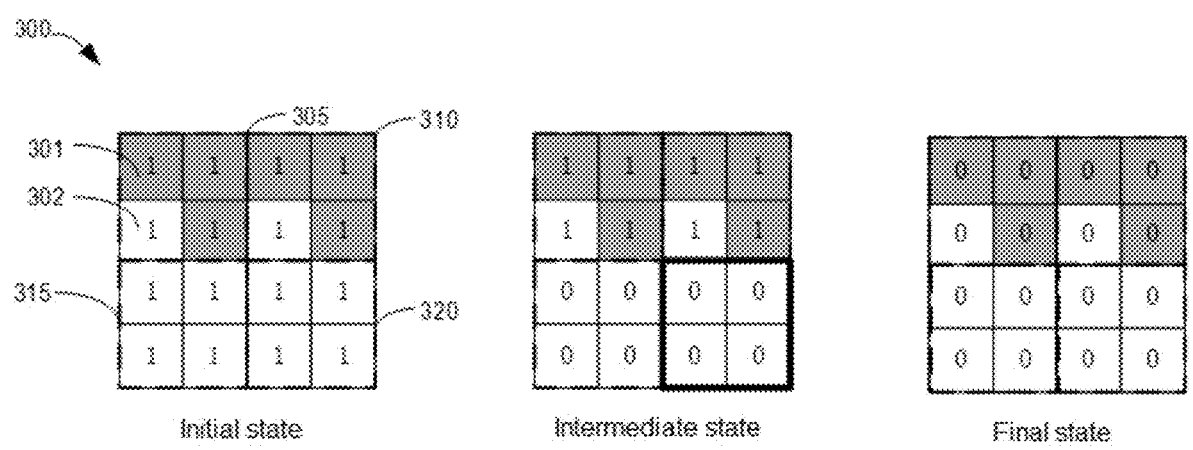
FIG. 3 shows a schematic diagram of a process of replicating a data block according to some embodiments of the present disclosure.

FIG. 3 shows schematic diagram 300 of a process of replicating a data block according to some embodiments of the present disclosure. FIG. 3 shows different states of a plurality of data blocks in source storage device 110 during an initial replication period. In FIG. 3, a gray grid, such as grid 301, represents a hot data unit. A white grid, such as grid 302, represents a cold data unit. Data blocks 305, 310, 315, and 320 marked with dashed boxes represent different data blocks. As shown in the figure, compared to data blocks 315 and 320, data block 305 and data block 310 can be classified as hot data blocks because they include more hot data units. A bold border marks a data block being initially replicated. In the initial state, all grids are marked as 1. This can indicate that all data units have not been initially replicated to target storage device 120.

In some embodiments, the hot data blocks may start to be replicated after all cold data blocks are replicated to target storage device 120. For example, initial replication may be performed in the order of data blocks 315, 320, 305, and 310. After cold data blocks 315 and 320 are both initially replicated to target storage device 120, hot data blocks 305 and 310 start to be replicated. As shown in the intermediate state, data block 320 is marked with a bold border, which can indicate that data block 320 is being initially replicated. In addition, a data unit in data block 315 is marked as 0, which indicates that the data unit in data block 315 has been initially replicated to target storage device 120. Data units in data blocks 305 and 310 are marked as 1, which indicates that the data units in data blocks 305 and 310 have not been initially replicated to target storage device 120.

In some embodiments, the hot data blocks may be replicated after a portion of the cold data blocks are replicated to target storage device 120. For example, initial replication may be performed in the order of data blocks 315, 305, 310, and 320. After only cold data block 315 is initially replicated to target storage device 120, hot data blocks 305 and 310 and cold data block 320 start to be replicated. In other implementations, the cold data blocks may be initially replicated and then other data blocks may be replicated in parallel. In the final state, data units in all data blocks are marked as 0, which indicates that all data blocks have been initially replicated to target storage device 120.

Figure 4:
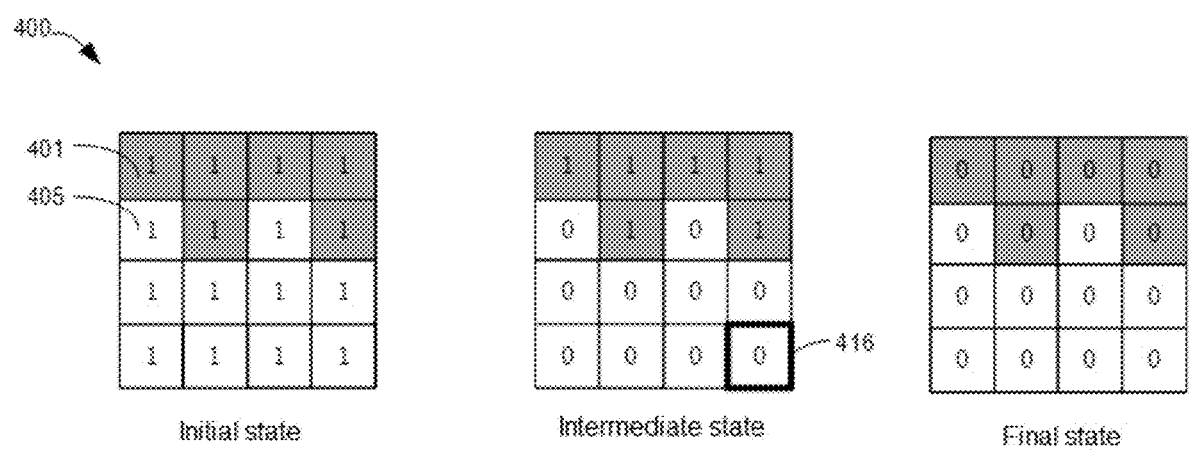
FIG. 4 shows a schematic diagram of another process of replicating a data block according to some embodiments of the present disclosure.

FIG. 4 shows schematic diagram 400 of another process of replicating a data block according to some embodiments of the present disclosure. The difference from FIG. 3 is that each data block in FIG. 4 includes only one data unit. Each data block in FIG. 4 is marked as 401 to 416 from top to bottom and from left to right.

In some embodiments, the hot data blocks may start to be replicated after all cold data blocks are replicated to target storage device 120. For example, the hot data blocks may start to be replicated after all the cold data blocks may be initially replicated to target storage device 120 in the order of data blocks 405, 407, 409-416. As shown in an intermediate state, data block 416 is marked with a bold border, which can indicate that data block 416 is being initially replicated. In addition, all the cold data blocks are marked as 0, which indicates that all the cold data blocks have been initially replicated to target storage device 120. All the hot data blocks are marked as 1, which indicates that all the data blocks have not been initially replicated to target storage device 120.

In some embodiments, the hot data blocks may be replicated after a portion of the cold data blocks are replicated to target storage device 120. For example, a portion of the cold data blocks may be initially replicated in the order of data blocks 409 to 416 first. Then, the initial replication is performed in the order of data blocks 401 to 408. In other implementations, the cold data blocks may be initially replicated and then other data blocks may be replicated in parallel. In the final state, data units in all data blocks are marked as 0, which indicates that all data blocks have been initially replicated to target storage device 120.

Figure 5:
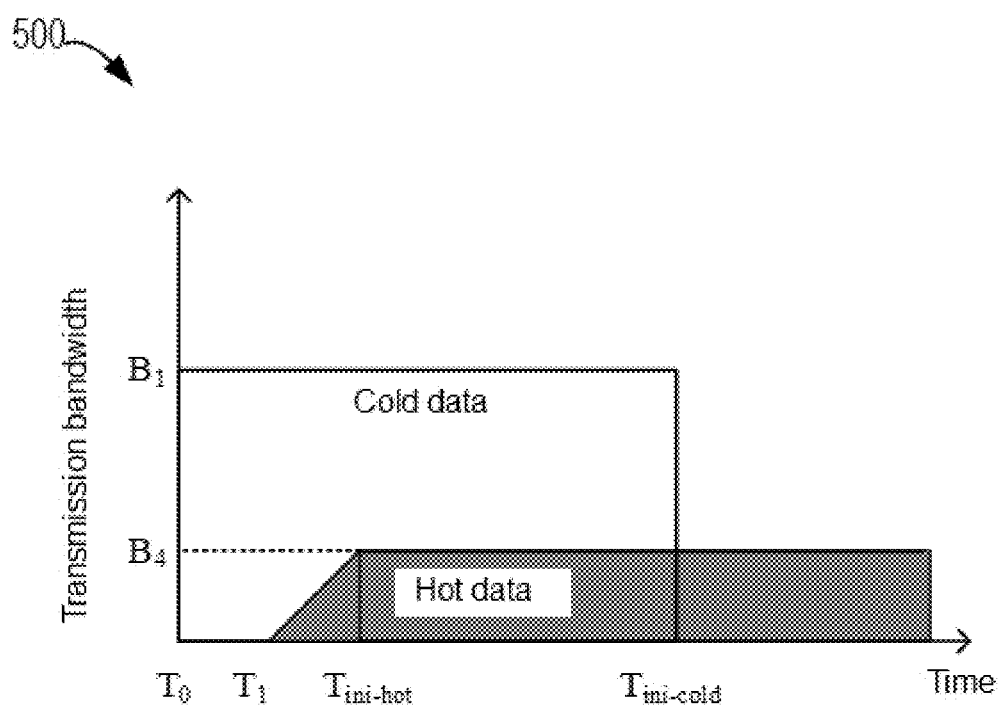
FIG. 5 shows a schematic diagram of initial replication according to some embodiments of the present disclosure.

FIG. 5 shows schematic diagram 500 of an initial replication process according to some embodiments of the present disclosure. In FIG. 5, the abscissa represents time, and the ordinate represents transmission bandwidth used for replication, and the product of the and transmission bandwidth (area shown in FIG. 5) can indicate the amount of data to be replicated. Similarly, the white area can indicate the amount of cold data being replicated, and the gray area can indicate the amount of hot data being replicated. It should be understood that, given a certain amount of data, as the transmission bandwidth grows larger, the required replication time grows shorter. In addition, during the initial replication period, since the cold data blocks will not be overwritten, the amount of data to be replicated to target storage device 120 will remain unchanged. In contrast, during the initial replication period, since the hot data blocks will be overwritten, the amount of hot data to be replicated to target storage device 120 will be increasing.

In some embodiments, at $T_0$, the cold data blocks may be initially replicated with a constant transmission bandwidth $B_1$. In other embodiments, the cold data blocks may be initially replicated with a varying transmission bandwidth $B_1$. After a portion of the cold data blocks are replicated, the hot data blocks may be replicated at $T_1$. For example, the hot data blocks may be initially replicated with a varying or constant transmission bandwidth $B_2$ (not shown). Meanwhile, since the hot data blocks are overwritten after being initially replicated to target storage device 120, a certain transmission bandwidth may be required to replicate the overwritten hot data blocks. Therefore, an overall bandwidth $B_3$ (not shown) which is greater than transmission bandwidth $B_2$ may be used to replicate the hot data blocks. In addition, as shown in FIG. 5, with the passage of time, more and more hot data blocks are overwritten, so an overall bandwidth $B_3$ progressively increasing may be used to replicate the hot data blocks. It should be understood that the slope shown in FIG. 5 is merely illustrative. It should be understood that a cold data block may also include a hot data unit, and a hot data block may also include a cold data unit. Therefore, prior to $T_1$, a small amount of transmission bandwidth may be consumed for hot data replication.

At $T_{ini-hot}$, all the hot data blocks are initially replicated to target storage device 120. After that, the transmission bandwidth is no longer required to initially replicate the hot data blocks, but a certain transmission bandwidth $B_4$ is still required to replicate the hot data blocks that are continuously overwritten in source storage device 110. Since it is only used for replicating the hot data blocks that are re-overwritten, transmission bandwidth $B_4$ that is smaller than or equal to overall bandwidth $B_3$ may be used to re-replicate the hot data blocks that are overwritten.

Depending on transmission bandwidth $B_1$, at $T_{ini-cold}$, all the cold data blocks are initially replicated to target storage device 120. Depending on the values of the transmission bandwidths $B_1$, $B_2$, $B_3$, and $B_4$, time $T_{ini-hot}$ for completing the initial replication of the hot data blocks and time $T_{ini-cold}$ for completing the initial replication of the cold data blocks may be different. Generally, since the amount of cold data is greater than the amount of hot data, $T_{ini-hot}$ is usually smaller than $T_{ini-cold}$. A time later than $T_{ini-hot}$ and $T_{ini-cold}$ may be used as time $T_{ini}$ for completing the initial replication of all the data blocks. In some embodiments, the values of the transmission bandwidths $B_1$, $B_2$, $B_3$, and $B_4$ may be optimized, so that $T_{ini-hot}$ and $T_{ini-cold}$ are as close as possible and time $T_{ini}$ for completing the initial replication is minimized, thereby improving the efficiency of data replication.

According to the embodiments of the present disclosure, by delaying the time at which initial replication of hot data blocks is started, the amount of hot data that needs to be re-replicated before the initial replication of cold data blocks is completed is reduced. Therefore, when the total transmission bandwidth is limited, transmission bandwidth $B_4$ for replicating overwritten hot data blocks can be reduced, and transmission bandwidth $B_1$ for replicating cold data blocks can be increased, thereby shortening the overall initial replication time $T_{ini}$. In addition, by delaying the time at which initial replication of hot data blocks is started, waste of resources for repeatedly replicating hot data blocks that have been overwritten multiple times can be reduced.

Figure 6:
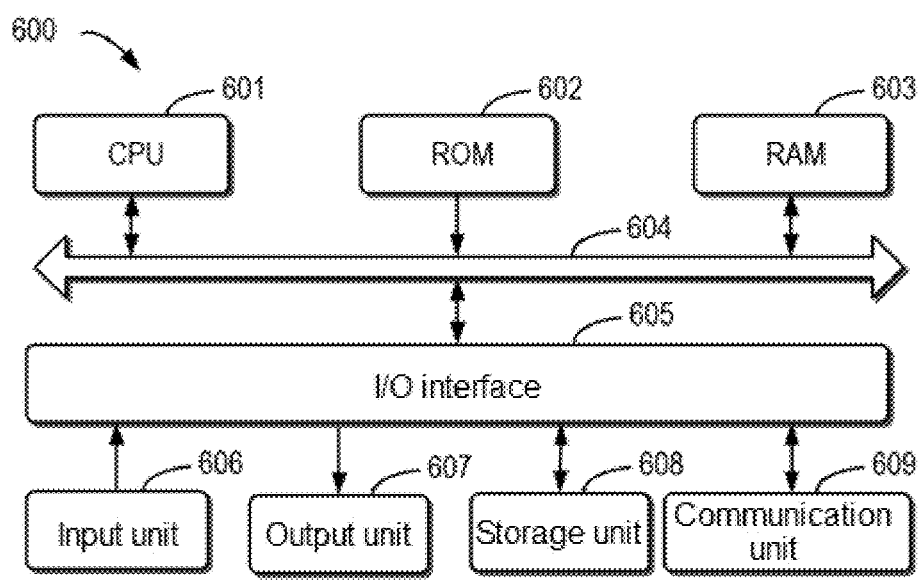
FIG. 6 shows a block diagram of an example computing device that may be used to implement embodiments of the present disclosure.

FIG. 6 shows a schematic block diagram of example device 600 that may be used to implement embodiments of the present disclosure. For example, device 600 may be implemented in environment 100 as shown in FIG. 1. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices over a computer network such as an Internet and/or various telecommunication networks.

The various processes and processing described above, such as method 200, may be executed by processing unit 601. For example, in some embodiments, method 200 may be implemented as a computer software program that is tangibly included in a machine-readable medium, such as storage unit 608. In some embodiments, part or all of the computer program may be loaded and/or installed onto device 600 via ROM 602 and/or communication unit 609. When the computer program is loaded to RAM 603 and executed by CPU 601, one or more actions of method 200 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, an instruction set architecture (ISA) instructions, machine instructions, machine-dependent instructions, microcode, firmware instructions, state setting data, or in one or more programming languages source code or object code written in any combination of the programming languages, including an object oriented programming language—such as Smalltalk, C++ like and conventional procedural programming languages—such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. When a remote computer is involved, the remote computer may be connected to a user computer through any kind of network, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus (system), and the computer program product implemented according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flowcharts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed basically in parallel, and sometimes they may also be executed in an inverse order, which depends on the functions involved. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for replicating data, comprising:
   determining overwritten probabilities of a plurality of data blocks in a source storage device, each respective data block including an overwritten probability, of the overwritten probabilities, indicating a probability of the respective data block being overwritten in the source storage device before the plurality of data blocks are all replicated to a target storage device;
   classifying the plurality of data blocks as cold data blocks or hot data blocks based on the overwritten probabilities of the plurality of data blocks, overwritten probabilities of the hot data blocks being higher than overwritten probabilities of the cold data blocks; and
   replicating at least a portion of the cold data blocks to the target storage device prior to the hot data blocks.

2. The method according to claim 1, wherein replicating at least the portion of the cold data blocks to the target storage device prior to the hot data blocks comprises at least one of the following:
   replicating the hot data blocks after replicating all of the cold data blocks to the target storage device; and
   replicating the hot data blocks after replicating a portion of the cold data blocks to the target storage device.

3. The method according to claim 1, wherein determining the overwritten probabilities comprises determining each of the overwritten probabilities based on at least one of the following:
   a read and write history of a data block;
   a type of data block; and
   a overwritten probability of a neighboring data block.

4. The method according to claim 3, wherein each of the plurality of data blocks comprises at least one data unit, and determining each of the overwritten probability of each data block probabilities comprises:
   determining a possibility of the at least one data unit, of the respective data block, being overwritten before the plurality of data blocks are all replicated to the target storage device; and
   determining the overwritten probability of the respective data block based at least on the possibility of the at least one data unit of the respective data block.

5. The method according to claim 4, wherein determining the possibility of the at least one data unit of the respective data block comprises determining the possibility based on at least one of the following:
   a read and write history of a data unit;
   a type of data unit; and
   a possibility of a neighboring data unit being overwritten.

6. The method according to claim 1, further comprising:
   when replicating the plurality of data blocks to the target storage device, re-replicating the plurality of data blocks in the source storage device, which are overwritten after being replicated to the target storage device, to the target storage device.

7. An electronic device, comprising:
   a processor; and
   a memory coupled to the processor, the memory having instructions stored therein, and the instructions, when executed by the processor, causing the device to execute actions comprising:
   determining overwritten probabilities of a plurality of data blocks in a source storage device, each respective data block including an overwritten probability, of the overwritten probabilities, indicating a probability of the respective data block being overwritten in the source storage device before the plurality of data blocks are all replicated to a target storage device;
   classifying the plurality of data blocks as cold data blocks or hot data blocks based on the overwritten probabilities of the plurality of data blocks, overwritten probabilities of the hot data blocks being higher than overwritten probabilities of the cold data blocks; and
   replicating at least a portion of the cold data blocks to the target storage device prior to the hot data blocks.

8. The device according to claim 7, wherein replicating at least the portion of the cold data blocks to the target storage device prior to the hot data blocks comprises at least one of the following:
   replicating the hot data blocks after replicating all of the cold data blocks to the target storage device; and
   replicating the hot data blocks after replicating a portion of the cold data blocks to the target storage device.

9. The device according to claim 7, wherein determining the overwritten probabilities comprises determining each of the overwritten probabilities based on at least one of the following:
   a read and write history of a data block;
   a type of data block; and
   a overwritten probability of a neighboring data block.

10. The device according to claim 9, wherein each of the plurality of data blocks comprises at least one data unit, and determining each of the overwritten probability of each data block probabilities comprises:
    determining a possibility of the at least one data unit, of the respective data block, being overwritten before the plurality of data blocks are all replicated to the target storage device; and
    determining the overwritten probability of the respective data block based at least on the possibility of the at least one data unit of the respective data block.

11. The device according to claim 10, wherein determining the possibility of the at least one data unit of the respective data block comprises determining the possibility based on at least one of the following:
    a read and write history of a data unit;
    a type of data unit; and
    a possibility of a neighboring data unit being overwritten.

12. The device according to claim 7, wherein the actions further comprise:
    when replicating the plurality of data blocks to the target storage device, re-replicating the plurality of data blocks in the source storage device, which are overwritten after being replicated to the target storage device, to the target storage device.

13. A computer program product having a non-transitory computer readable medium which stores a set of instructions to replicate data; the set of instructions, when carried out by computerized circuitry, causing the computerized circuitry to perform a method of:

determining overwritten probabilities of a plurality of data blocks in a source storage device, each respective data block including an overwritten probability, of the overwritten probabilities, indicating a probability of the respective data block being overwritten in the source storage device before the plurality of data blocks are all replicated to a target storage device;

classifying the plurality of data blocks as cold data blocks or hot data blocks based on the overwritten probabilities of the plurality of data blocks, overwritten probabilities of the hot data blocks being higher than overwritten probabilities of the cold data blocks; and replicating at least a portion of the cold data blocks to the target storage device prior to the hot data blocks.

\* \* \* \* \*